US008435917B2

(12) United States Patent
Estenfelder et al.

(10) Patent No.: US 8,435,917 B2
(45) Date of Patent: May 7, 2013

(54) AMMONIA OXIDATION CATALYSTS

(75) Inventors: Marvin Estenfelder, Novara (IT);
Alberto Cremona, Castell'Arquato (IT)

(73) Assignee: Sued-Chemie Catalysts Italia S.R.L., Novara (IT)

( * ) Notice: Subject to any disclaimer, the term of this patent is extended or adjusted under 35 U.S.C. 154(b) by 3 days.

(21) Appl. No.: 12/640,266

(22) Filed: Dec. 17, 2009

(65) Prior Publication Data
US 2010/0158784 A1  Jun. 24, 2010

(30) Foreign Application Priority Data
Dec. 23, 2008  (EP) .................................. 08172820

(51) Int. Cl.
| *B01J 23/00* | (2006.01) |
| *B01J 23/32* | (2006.01) |
| *B01J 23/40* | (2006.01) |
| *B01J 23/42* | (2006.01) |
| *B01J 23/58* | (2006.01) |
| *B01J 23/44* | (2006.01) |
| *B01J 23/02* | (2006.01) |
| *B01J 23/06* | (2006.01) |
| *B01J 23/08* | (2006.01) |
| B01D 53/56 | (2006.01) |
| B01D 53/86 | (2006.01) |
| B01J 8/00 | (2006.01) |
| C01B 21/00 | (2006.01) |

(52) U.S. Cl.
USPC ........... 502/302; 502/324; 502/325; 502/326; 502/328; 502/339; 502/340; 502/341; 502/355; 423/239.1

(58) Field of Classification Search ........... 502/100, 502/439, 300–355; 423/239.1; 422/176, 422/180, 183, 220, 222, 224; 60/299, 324
See application file for complete search history.

(56) References Cited

U.S. PATENT DOCUMENTS

| 4,820,678 A | | 4/1989 | Xu |
| 4,912,776 A | * | 3/1990 | Alcorn ........................ 423/239.1 |
| 4,963,521 A | | 10/1990 | Engler et al. |
| 5,217,939 A | | 6/1993 | Campbell |
| 5,690,900 A | | 11/1997 | Smojver |
| 6,451,278 B1 | | 9/2002 | Zolotarsky et al. |
| 6,827,917 B1 | | 12/2004 | Ward et al. |
| 7,722,845 B2 | * | 5/2010 | Caudle et al. .............. 423/239.1 |
| 2006/0182676 A1 | * | 8/2006 | Tran et al. ................... 423/239.1 |
| 2006/0204415 A1 | * | 9/2006 | Jiang et al. ................... 422/211 |
| 2006/0216467 A1 | * | 9/2006 | Yoshida ........................ 428/116 |
| 2008/0075655 A1 | | 3/2008 | Davydov et al. |
| 2010/0113244 A1 | * | 5/2010 | Chi et al. ........................ 501/32 |

FOREIGN PATENT DOCUMENTS

| GB | 2 406 802 A | 4/2005 |
| WO | WO 98/28073 | 7/1998 |
| WO | WO 99/25650 | 5/1999 |
| WO | WO 2006/009453 A1 | 1/2006 |
| WO | WO 2008/090450 A1 | 7/2008 |

OTHER PUBLICATIONS

Chinese Patent Application Publication No. 86/108985, dated Apr. 20, 1988 (Abstract only).

* cited by examiner

*Primary Examiner* — Anthony J Zimmer
(74) *Attorney, Agent, or Firm* — Scully, Scott, Murphy & Presser, P.C.

(57) ABSTRACT

Ammonia oxidation catalyst units comprising a pair of honeycomb-type blocks having interplaced between them a layer of a gas permeable material performing the function of radially mixing the gas flow, said blocks comprising an ammonia oxidation catalysts, and having height of less than 15 cm and the interplaced layer height of 3 to 0.5 cm.

10 Claims, No Drawings

AMMONIA OXIDATION CATALYSTS

The present invention relates to an ammonia oxidation catalyst unit formed of a pair of honeycomb-type blocks comprising an ammonia oxidation catalyst and having interplaced between them a layer of foamed material.

BACKGROUND OF THE INVENTION

For many years, the catalysts for ammonia oxidation have been formed of meshes or gauzes of platinum or its alloy with other precious metals.

Such catalysts have good activity and selectivity but suffer from the disadvantage that the catalyst is not only very expensive but also it exhibits an appreciable loss of platinum at the high temperatures of the oxidation reaction with consequent low catalyst life, which requires frequent replacement.

It is therefore desirable to provide a replacement of such precious metal catalyst.

It is well known that oxides of metals such as manganese, iron, nickel or, especially cobalt, often used in conjunction with one or more rare earth metal oxides, exhibit activity for ammonia oxidation.

CN-A-86/108 985 describes a catalyst composition of formula $La_{1-x}CeCoO_3$ (where x is a number from 0 to 1) having perovskite structure, endowed with good activity and selectivity when tested on small scale, which decreases when operating at temperatures (800°-1000° C.) normally employed for ammonia oxidation.

U.S. Pat. No. 4,963,521 describes an exhaust gas catalyst which, in one embodiment, is formed of honeycomb cordierite coated with a first layer of gamma alumina mixed with minor proportion of zirconia and ceria, and a second layer formed of cobalt oxide or platinum, rhodium and palladium.

No mention is made that the catalyst can be used for oxidizing ammonia.

U.S. Pat. No. 5,217,939 describes an ammonia oxidation catalyst obtained by coating a reticulated foamed ceramic or metal substrate with cobalt oxide or with a noble metal.

The coating is obtained by immersion of the foamed substrate in a solution of a carboxylate of cobalt, or of a noble metal, removing the substrate from the solution and calcinating at temperatures from 260° to 800° C. (at which the cobalt carboxylate is converted into oxide and the carboxylate of the noble metal is reduced to the metal).

The ceramic foams have a number of pores per linear inch of 10 to 100 (4-40/cm); 30 pores in the examples.

The conversion of ammonia to NO using the foam-Co oxide coated is 92-95%; using the foam coated with Pt 97-100%.

Further processing is necessary to convert nitric oxide (NO to $NO_2$) and then to nitric acid.

More efficient and economical catalysts in the production of nitric acid are therefore needed.

More efficient catalysts producing relatively high yields of $NO_2$ are described in U.S. Pat. No. 5,690,900. The catalysts are formed of porous ceramic (200-600 cells per square inch i.e. 14-24 cells per linear inch=5-9 cells/cm) coated with at least three layers: the first is formed of alumina with minor proportion of ceria and zirconia, the second of oxides of cobalt, zirconium and cerium, the third of platinum metal.

The layers are obtained by immersing the porous ceramic body in a suspension of alumina, zirconium oxide and cerium nitrate, removing the impregnated ceramic structure and calcinating at 600° to 1000° C.

The resulting surface area is 80-120 $m^2/g$.

The thus coated ceramic is then immersed in a solution of cobalt acetate, cerium nitrate and zirconium acetate, removed from the solution, and calcinated at 600-1000° C.

The last layer is obtained by immersion in a solution of platinum oxalate, and calcination at 600-1000° C. of the structure removed from the solution of the previous treatment.

The ammonia conversion to $NO/NO_2$ is 95-100% with $NO/NO_2$ ratio of 75/25 to 60/40.

U.S. Pat. No. 4,820,678 describes honeycomb-like alloy tapes coated with a catalyst having the perovskite ($ABO_3$) or spinel ($A_2BO_4$) structure, wherein A comprises cations of rare earth metal, B, in the perovskite structure, is selected from manganese, copper and nickel cations, in the spinel structure is selected from iron and nickel.

The catalyst is used for the purification of industrial waste gases, exhaust gases from automobiles, and purification of air.

The honeycomb tapes are obtained by perforating Fe—Cr—Al or Fe—Ni—Al alloy strips of about 0.05-0.12 mm thickness at distance of about 1.1-1.2 mm apart to form small holes of 0.4×0.4 mm.

OBJECTS

It is an object of the present invention to provide ammonia oxidation catalysts comprised in honeycomb-type structures (wherein, due to their tubular structure, no radial gas flow mixing occurs and therefore no satisfactory conversion of the reagents) capable of giving high catalyst performance in terms of activity and selectivity and high specific productivity referred to the volume of the honeycomb structure bed and the weight of the catalyst.

SUMMARY OF THE INVENTION

The ammonia oxidation catalysts of the present invention are formed of one or more unit structures each of which formed of a pair of blocks having honeycomb-type structure comprising catalyst material, the blocks having interplaced between them a layer of gas permeable material wherein a radial mixing of the reagent gas flow is obtained.

DETAILED DESCRIPTION OF THE INVENTION

The blocks have height of not more than 15 cm, preferably not more than 10 and more preferably not more than 6 cm and more than 2 cm. The height of the interplaced layer is more than 0.5 cm and not more than 3 cm preferably not more than 2 cm.

A foamed material having open, randomly connected cells is usable to form the interplaced layer.

For honeycomb-type structure it is meant a structure formed of tubular not interconnected through bores.

As indicated, in the above structure the interplaced layer performs the function of thoroughly mixing the gas flow exiting the first honeycomb block wherein, due to laminar piston-type flow inside the tubular not interconnected through bores, no radial mixing occurs, thus allowing better conversion inside the second block.

The laminar piston-type flow inside the tubular through bores of the blocks favors the maintenance of constant reagents concentration at contact with the catalyst covering the walls of the through bores.

The material of honeycomb-type block preferably is ceramic or metallic; any other material resistant to the high temperatures of the ammonia oxidation reaction can also be used. For example, the material of the honeycomb type block can be a perovskite of the $ABO_3$ type wherein A is a rare earth-element or an alkaline-earth element or mixtures thereof and B is a transition metal element or mixtures thereof.

The density of the cells ranges from 3 to 10 cells/cm; that of the pores of the foamed material is of 4 to 20/cm.

Commercial honeycomb-type blocks are available from Emitech-Germany; commercial foams from Hi-Tech Ceramics—NY, USA.

Foamed alpha alumina and reticulated foams with open cells randomly connected are preferred.

Usable honeycomb-type alloy blocks can also be obtained from tapes prepared according to U.S. Pat. No. 4,820,678.

Any type of ammonia oxidation catalyst can be used in the honeycomb-type structure unit according to the invention. The final catalyst can be obtained by either
a) coating an inert honeycomb monolithic structure with the active element or
b) extruding the active element powder to a honeycomb monolithic type structure.

A preferred catalyst comprises mixed oxides of cobalt, manganese and rare earth metals having composition expressed as percentage by weight of CoO, MnO and rare earth oxide in the lowest state of valence as follows: 20-45% CoO, 50-60% MnO, 0.5-20% rare earth metal oxide, preferably $La_2O_3$ and its mixtures with $CeO_2$. The mixed oxides are supported on porous inorganic metal oxides, preferably gamma alumina. Catalysts of this type containing CuO in place of CoO, and the preparation thereof are described in WO 2008-090450.

Examples of other usable catalysts are described in U.S. Pat. Nos. 5,217,939 and 5,690,900, and WO 99/25650. Other examples are the perovskite type catalyst ($ABO_3$) and the spinel type ($AB_2O_4$).

The catalyst unit allows to obtain high conversion of ammonia to NO.

The oxidation reaction conditions are: temperature from 200° C. to 900° C., pressure 1 to 12 bar abs., GHSV 8.000-140.000 $h^{-1}$.

The unit, thanks to its specific structure offers advantages with respect to the back pressure and increases the space-time yield since the throughput of the existing plants can be more heavily loaded.

EXAMPLE 1

A catalyst unit formed of three units of honeycomb-like structure ceramic blocks each having 5 cm height, 62 cells/$cm^2$ and including two layers of foamed alfa alumina each 2 cm thick interplaced by alternating one block of monolith and one foam until the five structures are arranged in cascade, was prepared by immersing the blocks in a slurry containing gamma alumina milled to 1 to 10 μm having supported on it a mixed oxides catalyst of composition expressed in percentage by weight of CoO, MnO and $La_2O_3$ of 37.4% CoO, 53.4% MnO and 9.2% $La_2O_3$. The supported catalyst comprised also Pt in amount of 0.1-0.2 wt %. Said transition metal oxides are supported on gamma alumina in a global amount equal to 20% by weight. The slurry is further composed of deionized water and made acidic to pH 4 with acetic acid.

The catalyst was prepared by impregnating gamma alumina with an aqueous solution of lanthanum nitrate ($La(NO_3)_3$).

The impregnated support was then dried at 110° C., calcined at 600° C. to and thereafter impregnated with an aqueous solution of manganese nitrate ($Mn(NO_3)_2$), cobalt nitrate ($Co(NO_3)_2$) and $Pt(NH_3)_4Cl_2$, and dried at 120° C.

A volume of solution equal to 100% of the pore volume of alumina was used for impregnation.

The immersed blocks were removed from the slurry and calcinated at 500° C. to obtain reduction of platinum ions to metal.

The thus obtained unit was inserted into a reactor for ammonia oxidation. The reaction conditions were: GHSV=10.000 $h^{-1}$, temperature of the gas mixtures taken at the inlet of the catalyst unit 550° C., pressure 1 bar and ammonia concentration equal to 1% v/v in air.

The conversion of ammonia to NO was higher than 96%.

COMPARISON EXAMPLE 1

A catalyst unit similar to that used in Example 1, but not comprising the foamed alumina layers, was used in a test of ammonia oxidation carried out under the same conditions as in Example 1.

The conversion of ammonia to NO was 87%.

COMPARISON EXAMPLE 2

A catalyst unit formed of a single honeycomb-like structure ceramic block having 15 cm height, 62 cells/cm2 was prepared according to the procedure already described in the EXAMPLE 1 and was used in a test of ammonia oxidation carried out under the same conditions as in Example 1.

The conversion of ammonia to NO was 74%.

The disclosures in European Patent Application No. 08172820 from which this application claims priority are incorporated herein by reference.

What is claimed is:

1. A catalyst for ammonia oxidation formed of one or more catalytic units each of which formed of a pair of blocks having a honeycomb structure containing tubular passages not interconnected through bores, comprising an ammonia oxidation catalyst, each of said blocks having height of less than 15 cm and more than 2 cm and interplaced between them a foamed layer having a height of not more than 3 cm and at least of 0.5 cm, formed of foamed material having open, randomly connected cells wherein the ceramic material of the blocks having honeycomb type structure has a perovskitic structure of $ABO_3$ wherein A is a rare earth-element or an alkaline-earth element or mixtures thereof and B is a transition metal element or mixtures thereof.

2. The catalyst according to claim 1, wherein the interplaced foamed layer has a height of 0.5-2 cm.

3. The catalyst according to claim 1, wherein the height of each of the blocks is from 2 to 6 cm.

4. The catalyst according to claim 1, wherein the density of cells of the foamed layer ranges from 3 to 10 cells/cm.

5. The catalyst according to claim 1, wherein the blocks are formed of ceramic or metallic material.

6. The catalyst according to claim 1, wherein the blocks have a number of cells per cm, which can be the same or different, from 3 to 10 and wherein the number of pores per cm of the foamed layer is 4 to 20.

7. The catalyst according to claim 1, wherein the foamed layer is formed of foamed alumina.

8. A catalysts for ammonia oxidation formed of one or more catalytic units each of which formed of a pair of blocks having a honeycomb structure containing tubular passages not interconnected through bores, comprising an ammonia oxidation catalyst, each of said blocks having height of less than 15 cm and more than 2 cm and interplaced between them a foamed layer having a height of not more than 3 cm and at least of 0.5 cm, formed of foamed material having open, randomly connected cells wherein the ammonia oxidation catalyst is in form of a coating obtained by immersing the blocks in a slurry containing gamma alumina having supported on it a mixed oxides catalyst of composition expressed in percentage by weight of CoO, MnO and rare earth metal oxides of 20-45% CoO, 50-60% MnO and 0.5-20% oxides of rare earth metals, removing the blocks from the slurry and calcinating them.

9. The catalyst according to claim 8, wherein the rare earth metal oxide is one of $La_2O_3$ and mixtures of $La_2O_3$ with $CeO_2$.

10. The catalyst according to claim 8, wherein a catalyst coating is present on the blocks, the catalyst coating comprises 0.001-1 wt % of Pt.

* * * * *